US008359890B2

(12) United States Patent
Kitchen

(10) Patent No.: US 8,359,890 B2
(45) Date of Patent: Jan. 29, 2013

(54) ELECTROMECHANICAL NON-NUMERIC CONTROL FOR LOCKS

(76) Inventor: Michael Brent Kitchen, Virginia Beach, VA (US)

( * ) Notice: Subject to any disclaimer, the term of this patent is extended or adjusted under 35 U.S.C. 154(b) by 868 days.

(21) Appl. No.: 12/372,930

(22) Filed: Feb. 18, 2009

(65) Prior Publication Data

US 2010/0206024 A1    Aug. 19, 2010

(51) Int. Cl.
*E05B 49/00* (2006.01)
*E05B 37/02* (2006.01)

(52) U.S. Cl. ............. 70/278.5; 70/301; 70/310; 70/315

(58) Field of Classification Search ............. 70/301, 70/304, 306, 309, 310, 315, 278.1, 278.4, 70/278.5
See application file for complete search history.

(56) References Cited

U.S. PATENT DOCUMENTS

| | | | |
|---|---|---|---|
| 843,365 A | 2/1907 | Raymond | |
| 2,008,150 A | 7/1935 | Nelson | |
| 2,344,088 A * | 3/1944 | Hinnerfeldt | ..................... 70/310 |
| 2,584,655 A * | 2/1952 | Amo | .............................. 70/138 |
| 3,611,761 A | 10/1971 | Atkinson | |
| 3,702,070 A | 11/1972 | Gartner | |
| 3,863,115 A | 1/1975 | Hasenbein | |
| 4,090,175 A * | 5/1978 | Hart | ............................. 70/278.2 |
| 4,104,896 A * | 8/1978 | Hahn | .............................. 70/310 |
| 4,455,552 A * | 6/1984 | Greiner et al. | ............. 70/333 R |
| 4,637,235 A | 1/1987 | Conner | |
| 5,522,243 A | 6/1996 | Kusmiss | |
| 5,552,587 A * | 9/1996 | Moorhouse | .................... 70/277 |
| 5,640,862 A | 6/1997 | Remenicky | |
| 5,664,446 A | 9/1997 | Kusmiss | |
| 5,775,252 A | 7/1998 | Kilgore | |
| 6,047,575 A | 4/2000 | Larson | |
| 6,764,007 B2 * | 7/2004 | Moorhouse et al. | .......... 235/454 |
| 7,383,708 B2 * | 6/2008 | Liu et al. | ........................ 70/310 |
| 2006/0037374 A1 | 2/2006 | Skelly | |
| 2006/0169007 A1 | 8/2006 | Fiegener | |

FOREIGN PATENT DOCUMENTS

GB    2270950 A    3/1994

* cited by examiner

*Primary Examiner* — Christopher Boswell
(74) *Attorney, Agent, or Firm* — Lawrence Lambelet

(57) ABSTRACT

A light fence represented by aligned apertures in a plurality of wheels permits the passage of a light beam to a sensor to activate an electro-mechanical control for a lock. Such an arrangement avoids the sound-producing mechanical action of the typical tumbler lock and safeguards discovery of the opening combination. Rather than the typical case of a numerical sequencing combination, a novel approach is taken by using visual pattern recognition to align the apertures. The electro-mechanical control of the present invention additionally features optimized energy use, customizable settings, precision positioning, and an expansion of possible combination permutations by including direction of rotation.

20 Claims, 5 Drawing Sheets

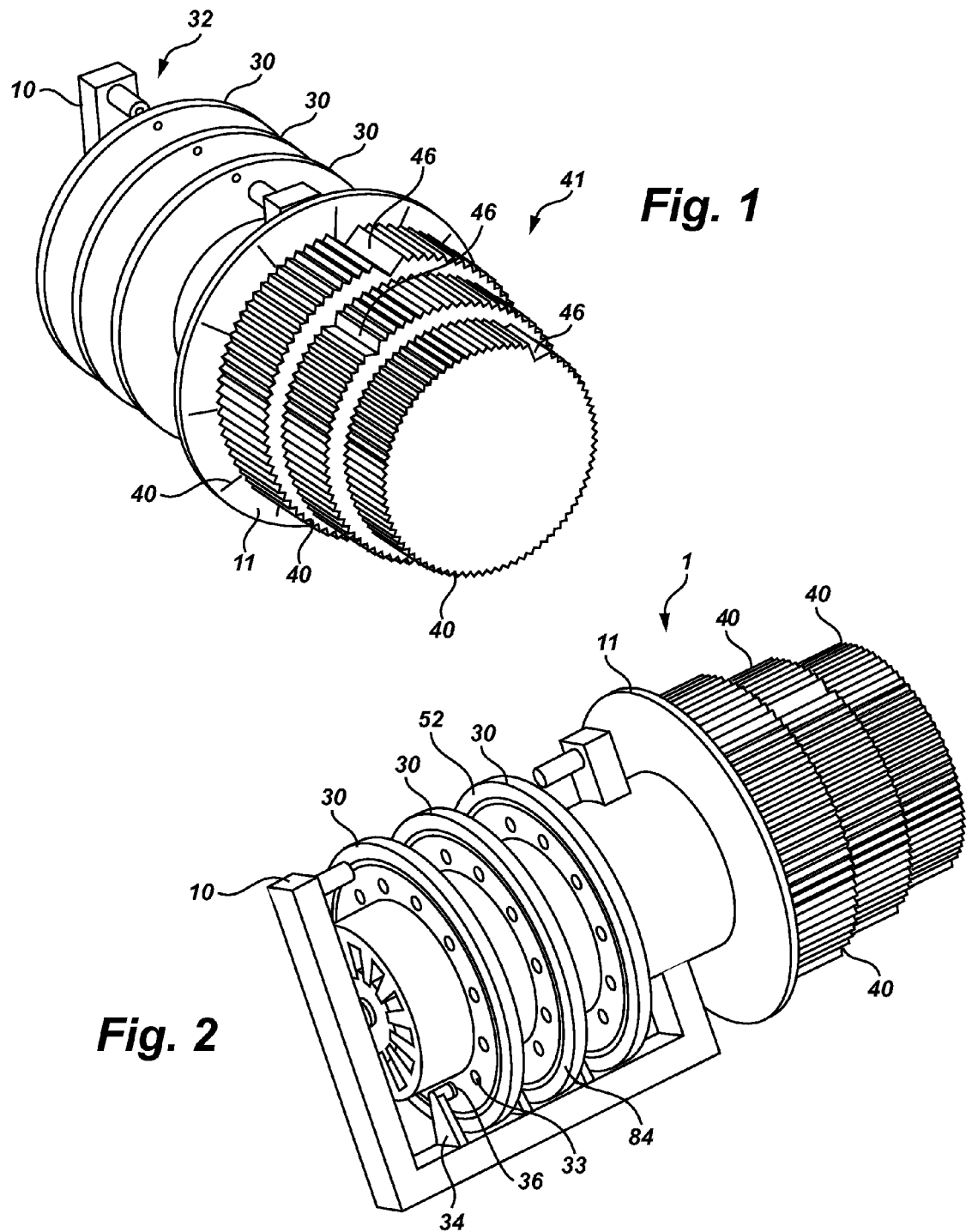

ELECTROMECHANICAL NON-NUMERIC CONTROL FOR LOCKS

FIELD OF THE INVENTION

This invention relates to combination locks, and more particularly to an electromechanical control mechanism using non-numeric encoding.

BACKGROUND OF THE INVENTION

Safes, vaults, lockers, and keyless entries, among other types of secure systems, use locks requiring a unique combination for access. Typically, the combination is a set of numbers and rotational sequences which align tumblers to a predetermined orientation. The tumblers make a sound when dropping and this "signature" can reveal the combination when sophisticated listening devices are used. Furthermore, telltale wear patterns can develop with mechanical abrasion and can similarly be detected with sensitive equipment.

One method of eliminating the mechanical action of tumblers is to use an optical alignment system. U.S. Patent Application 2206/0037374 to Skelly teaches the use of a light beam received by a sensor through aligned holes in three concentric tubes rotating about the common axis. The tubes can be manipulated by interfacing members on each tube such that a series of discrete rotations of the innermost tube, twisting clockwise and counterclockwise, bring the three into an alignment of the holes. The aligned holes enable a beam originating in the center to pass through to a sensor located outboard. The receipt of the beam passes a command to an unlocking mechanism. There are no tumblers to drop and no sound clues to witness the angular settings of the combination.

Similarly, in U.S. Pat. No. 2,008,150 to Nelson, a light signal traversing a "fence" of aligned holes in a series of disks mounted on a common shaft provides the means for controlling a lock. The combination is the individual orientation of each disk thus aligned. Except for one disk corresponding to a dial, the disks are free to rotate on the shaft, and in like manner to Skelly, each can be set into position by means of rotating the dial and engaging an interfacing geometry. The problem with such a system, however, is that the subsequent rotation of the moving part could disturb the prior setting of a positioned part. The common shaft, the case of Nelson, or the nested tubes, in the case of Skelly, would inevitably create rotational drag on co-journaled elements. What is missing in the prior art is a light fence where each disk can be individually set and registered to position.

The energy source for such opto-electrical systems is typically supplied by battery. If the light is rendered always on, or if it is switched on to initialize the combination setting procedure, battery life will be consumed and ultimately require service. The benefit in safety attendant to such an optical device is thus offset by the inconvenience of maintenance. It would be an advantage, therefore, to provide for conservation of energy use and extended battery life in the design of such systems.

Both Skelly and Nelson use number indices to orient the combination. Even if security breach were not a risk, number patterns are not particularly user-friendly. They can be hard to remember, especially if they are randomly chosen and not resettable in after-market use. Research has shown that visual patterns are processed in the brain in a different way than word or number patterns. Not only is visual recognition instantaneous, it is also easier to remember. Furthermore, visual patterns do not lend themselves to discovery by guessing, in the way that knowledge of an individual's background can sometimes suggest a number combination. Some means to set a visual pattern combination, therefore, would represent a needed improvement.

SUMMARY OF THE INVENTION

In view of the above-mentioned unfulfilled needs, the present invention embodies, but is not limited by, the following objects and advantages:

A first objective is to provide an optical means for controlling a lock.

A second objective is to define the optical means in terms of a light fence represented by concentrically-journaled rotating wheels.

A third objective is to render each wheel individually settable and thereby eliminate any drift in position caused by coaction.

A fourth objective is to provide a means for positively locating each such wheel.

A fifth objective is to provide a visual recognition means for identifying the combination representing the orientation of each wheel in alignment.

A sixth objective is to improve battery life by shortening the use period to a brief pulse.

A seventh objective is to extend the possible combination permutations by including rotation direction as an argument.

An eighth objective is to provide a logic process for validating an unlock command.

A ninth objective is to provide a means for customizing the combination.

In a preferred embodiment of the present invention, an electro-mechanical control for a lock comprises a plurality of mostly tubular shafts journaled concentrically about a common axis. Each shaft is individually rotatable about the axis. Each inner shaft extends from its outer in both axial directions. A matching plurality of wheels is fixed to one end of each shaft. The wheels each have an aperture at a common radial distance from the common axis. A plurality of dials is fixed to the other end of each shaft to thereby manipulate each wheel. Each dial has a preferred orientation corresponding to an alignment of the apertures.

The preferred embodiment further comprises a means for indicating the preferred orientation for each dial. A light source is positioned at one end of the plurality of wheels at the common radial distance. The light source is connected to a source of power through a means for connecting. A photo sensor is positioned on the other end of the plurality of wheels to detect a beam of light from the light source passed through the aligned apertures. Finally, a means is provided for controlling the opening of the lock when the dials have been set to the preferred orientation.

In a particular preferred embodiment, a means is provided for determining whether each wheel rotation was clockwise or counterclockwise. In this case, the means for controlling the opening of the lock includes the preferred direction as well as the preferred orientation. This effectively doubles the number of combination permutations.

In another particular preferred embodiment, the plurality of concentric shafts is provided the additional degree of freedom to translate back and forth along the common axis. This translational movement facilitates a push-pull contact means for connecting, which means can be actuated by a push on the shafts when the last preferred orientation is set. Such a mechanism appreciably reduces power requirements.

In still another particular preferred embodiment, a pawl and detent mechanism is provided to positively indicate and hold registration of the orientation of each wheel. The detents are arrayed to facilitate the preferred orientation. The pawls, when mounted on beam springs, responsively retract the shafts and bias the contact to the open position.

This provides a positive locating mechanism and further facilitates the optimization of power by maintaining a pulse-like interval for contact.

In yet another particular preferred embodiment, the means for indicating is one or more features on each dial the juxtaposition of which presents in a particular visual pattern when in the preferred orientation. The feature could be a distinguishing physical feature or could be a selected color. This provides a visual means for recognizing a combination represented by the preferred orientations and avoids the dependence on a numerical sequence.

In still yet another particular preferred embodiment, a logic process for a microcontroller, serving as the means for controlling, is provided. The logic process comprises the steps of comparing a rotation direction from an initial instance in stored memory to a current instance from an electro-magnetic sensor for each rotation of each dial; storing the information in the event of a match and discarding the information in the event of a mismatch; comparing an instance of light detection from the photo sensor with stored event information; sending a command to unbolt the lock mechanism in the event of a match of a light instance with a set of stored direction instances equaling the plurality and ignoring the light instance in the event of a mismatch; and, erasing stored direction instances in either a match or mismatch event associated with a light instance.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein:

FIG. 1 is a front perspective view of the invention;

FIG. 2 is a back perspective view of the invention;

DETAILED DESCRIPTION OF THE PREFERRED EMBODIMENT

Figure 3:
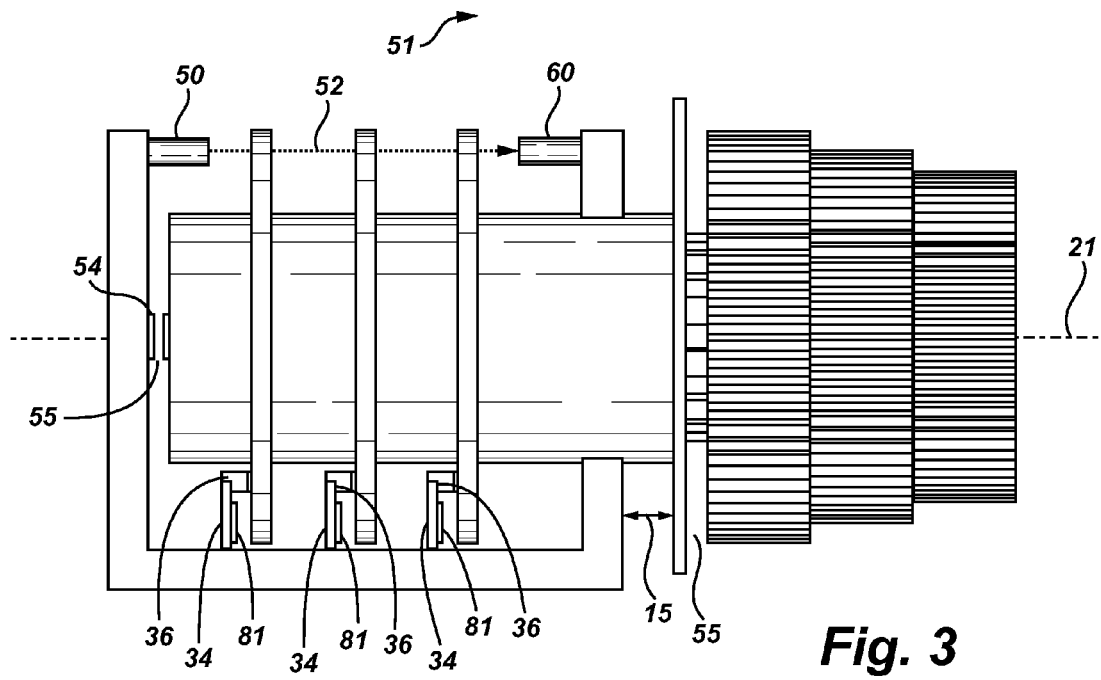
FIG. 3 is a side plan view of the invention.

The following is a brief description of function and a presentation of a featured novel concept. Referring to FIGS. 1 and 2, an electro-mechanical control 1 controls the opening of lock 2 (not shown). Lock 2 is a bolt or latch system which receives a signal from the electro-mechanical control 1 when preset parameters, otherwise known as a combination, are satisfied. Typically, these parameters are a set numbers dialed in a unique sequence. A novel feature of the present invention is to represent such a set of parameters in an easy to recognize and remember visual pattern. Such a pattern is shown in FIG. 1, where dials 40 display indicator notches 46 in particular angular orientations. Two embodiments of visual pattern 43 are shown in head-on views in FIGS. 4 and 5.

Figure 6:
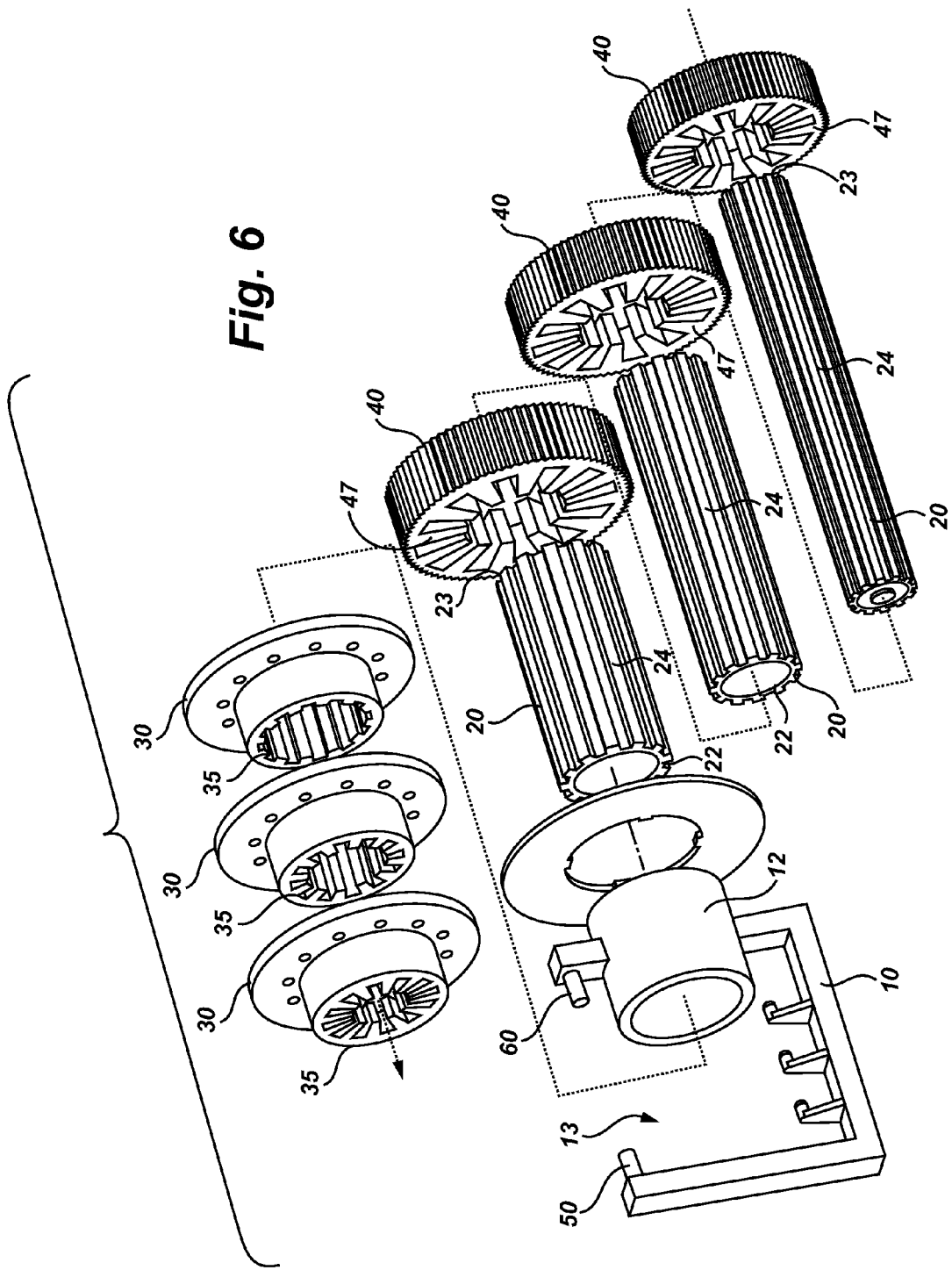
FIG. 6 is an exploded perspective view of the invention.

The pattern of the indicator notches 46 matches to an alignment of apertures 31 on wheels 30, which are connected to dials 40 by shafts 20 (FIG. 6). The alignment of apertures 31 permits light beam 52 (FIG. 3) to be passed from light source 50 to photo sensor 60. The receipt of the light beam 52 is the augment for passing a command to the lock 2 whereby an opening action is initiated.

Figure 4:
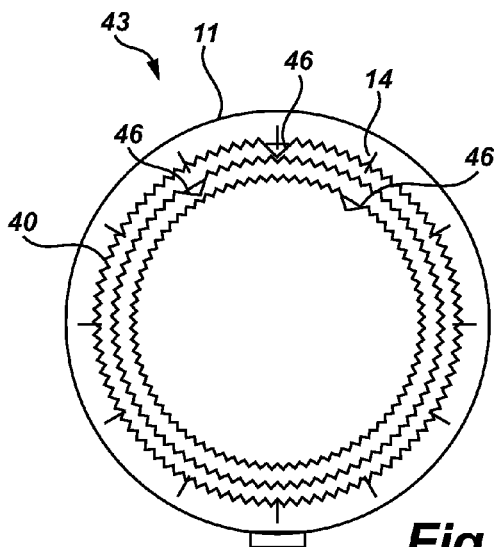
FIG. 4 is a front plan view, illustrating a first embodiment of a visual means of indicating.

Visual patterns, such as the one of FIG. 4, are culturally ubiquitous. Orientations involving twelve index positions, for example, such as can be found on an analog clock face, are easily discriminated. In the instant example, the orientations read, from left to right, 11 o'clock, 12 o'clock and 1 o'clock. This reading would be apparent even without indicia markings, as evidenced by certain blank clock faces sold under designer names.

The following is a detailed description of the present invention. Referring to FIG. 6, a collar 12 of chassis assembly 10 forms a housing for a plurality of shafts 20. The shafts 20, essentially of tubular construction, except for the innermost, assemble one inside another to form a concentrically-journaled composite. Each inner shaft extends from its outer in both directions along a common axis 21 (FIG. 3). Each shaft 20 has a proximal end 23 and a distal end 22. The distal ends 22 of the assembled shafts 20 are located in interior 13 of chassis assembly 10, the proximal ends 23 extending outward therefrom. Each shaft 20 is individually rotatable about common axis 21.

A particular multiplicity of index positions, such as twelve in the instant case, is represented by parallel grooves 24 in the exterior walls of shafts 20. Wheels 30 assemble to shafts 20 in the interior 13. Each shaft diameter is matched by a bore diameter in a corresponding wheel, and bosses 35 of wheels 30 are interposed with parallel grooves 24 when assembled to the cascaded extensions of distal ends 22. The interposition of bosses and grooves couples the wheel to the shaft, similar to the splined-shaft couplings of common usage. In a similar manner as wheels, dials 40 with dial bosses 47 assemble to proximal ends 23 to form a unitary rotational element with wheel and shaft. Each wheel 30 has the aperture 31 positioned a common radial distance from common axis 21.

The assembled components are shown in FIG. 3. A translational degree of freedom is provided by a gap 55, which is located both inside and outside of chassis assembly 10. The gap permits an open position for a push-pull contact 54. Push-pull contact 54 is closed by pushing on dials 40 to bridge gap 55 through the translation of shafts 20, thereby providing means for connecting 53. Means for connecting 53 links a power source 51 (not shown) to the light source 50 for an activation pulse. The power source 51 may be a battery 56 (FIG. 9), such as a Direct Energy Conversion Cell (DEC) having a multi-year life span. The light source 50 may be an energy-conserving LED 57 (FIG. 9), or any other battery-operated light emitter. The photo sensor 60 is positioned opposite the light source 50, on the opposite side of wheels 30, and in a line connecting light source 50 and apertures 31. Photo sensor 60 may be a photo diode 62 (FIG. 9), or similar light-sensitive receiver. Both light source 50 and photo sensor 60 may be hooded to selectively target the light source, thereby defeating any attempt to open the lock by "light flooding". The outboard end of collar 12, represented by mounting shank 15, is an allowance for through mounting, such as through the wall of a safe. In the sense of FIG. 3, all structure to the right of the shank 15 is external to the safe, and everything to the left is internal.

Referring to FIGS. 2 and 3, wheels 30 have detents 33 on one facing. Detents 33 are evenly arrayed in a circle and match in number to the index positions embodied by the parallel grooves 24. Pawls 36, at the end of beam springs 34, interface with the detents 33 such that the rotational position of each wheel 30 is positively registered. The beam springs 34 provide sufficient flex for the transition of wheels 30 from one detent position to another, snapping into the next detent when the corresponding dial is turned. In this manner, sequential settings may be made without disturbing a prior position, said position now held fixed by an engaged pawl and detent. The pawl and detent mechanism also provides for discrete dial locating so that angular discrimination is not left to judgment. Finally, beam springs 34 bias the push-pull contact 54 to the open position and instantly retract a push with a pull.

A means for determining rotation 80 is provided by electro-magnetic sensors 81 positioned on each beam spring 34 to read a magnetized wheel 82. Magnetized wheel 82 may be wheel 30 comprised of a magnetic material, or wheel 30 may otherwise have a magnetic strip 84 applied or embedded (FIG. 2). The electro-magnetic sensor detects whether a rotation is clockwise or counterclockwise. Using direction as a supplemental argument to position effectively doubles the possible combination permutations. In the instant case, the permutations would be 24×24×24, or 13,824. The electro-magnetic sensor 81 may be a Weigand sensor 83 (FIG. 9), or any comparable sensor detecting direction of rotation.

Figure 5:
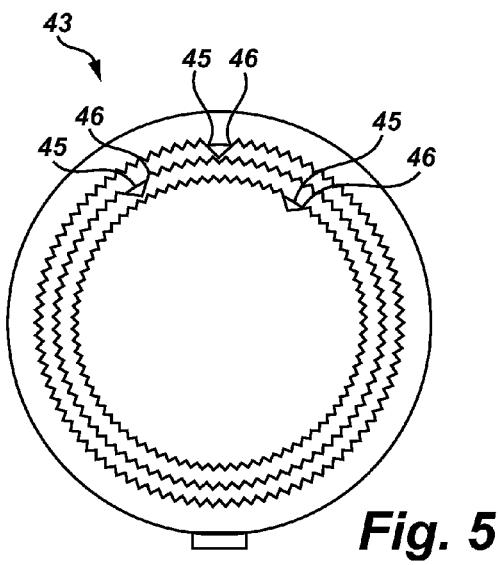
FIG. 5 is a front plan view, illustrating a second embodiment of a visual means of indicating.
Figure 7:
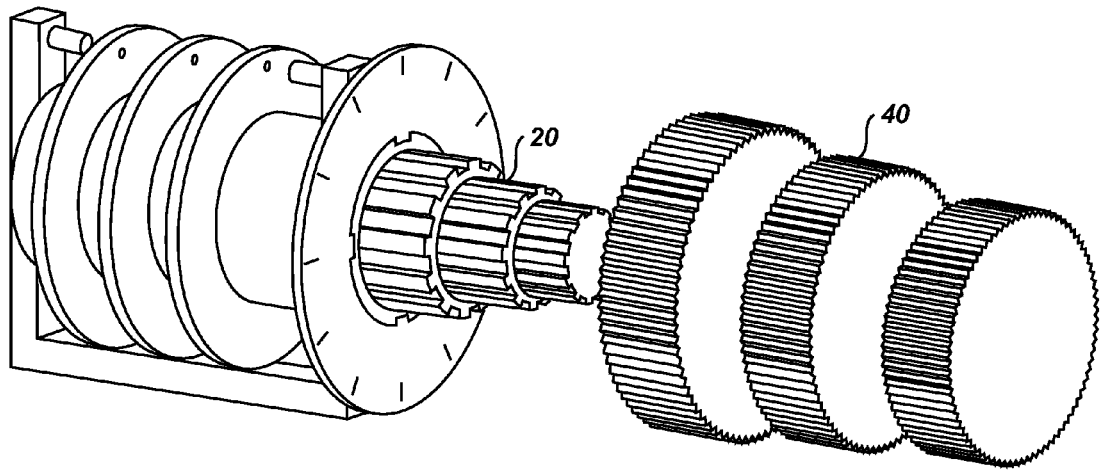
FIG. 7 is a front perspective view of the invention, illustrating a means for customizing the preferred orientations.
Figure 8:
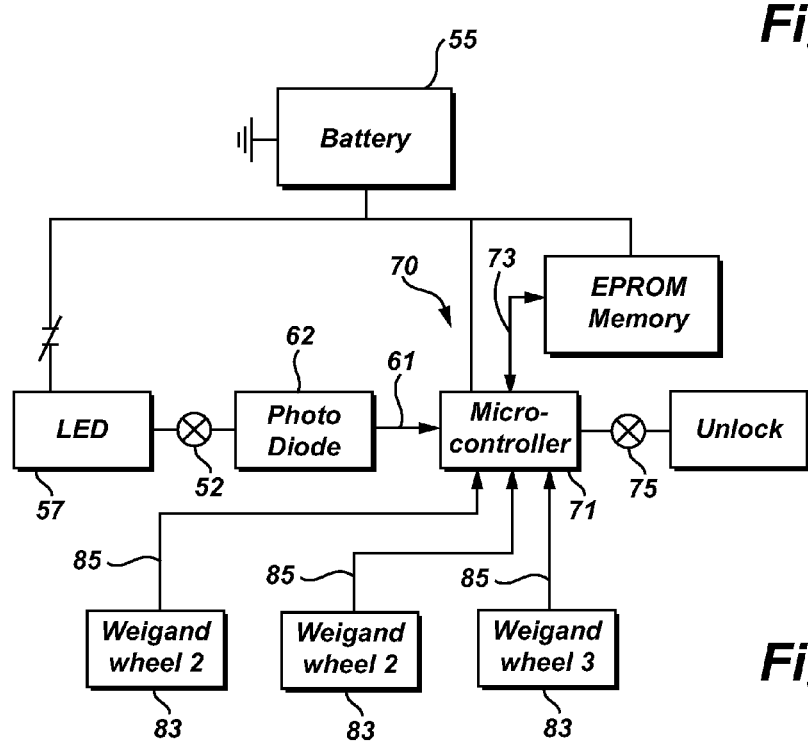
FIG. 8 is a block circuit diagram, illustrating power and sensor connections.

A unique setting of dials 40 will correspond to an alignment of apertures 31. A specific alignment 32 corresponds to preferred orientations 41, as shown in FIG. 1. Preferred orientations 41 demonstrate the visual pattern 43 of dials 40. Referring to FIGS. 4 and 5, visual pattern 43 may present as a array of physical feature 44 on each of the dials, such as the indicator notch 46. Indicia plate 11, having indicia markings 14, may be used as a guide in setting the preferred orientation 41. An alternate embodiment of visual pattern 43 is shown in FIG. 5, where notches 46 display a unique set of colors 45 from a spectrum of color mounted on a facing surface behind. Referring to FIG. 7, preferred orientations 41 can be customized by removing dials 40 from shafts 20 and repositioning them to correspond to a preferred pattern. The combination thus selected can be made permanent by bonding the outermost dial to in the innermost shaft, or otherwise fixing it thereto by known means, such as with a fastener.

Figure 9:
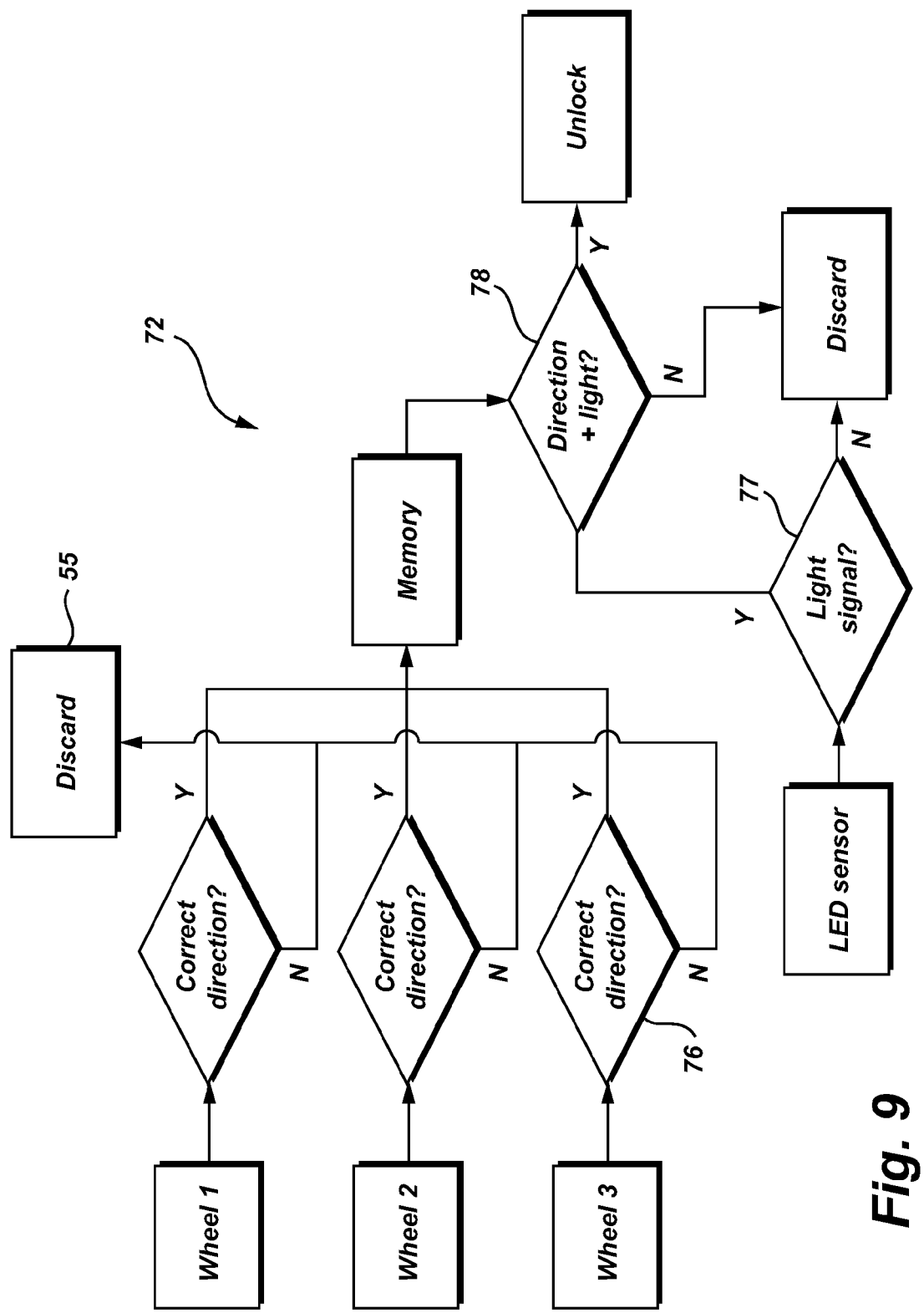
FIG. 9 is a logic process diagram for a microcontroller.

Turning to FIG. 9, a means for controlling 70 is represented by microcontroller 71. Microcontroller 71 receives direction information 85 from Weigand sensors 83 and processes it as stored information 73 in EPROM memory 75 according to logic process 72 (FIG. 10). Microcontroller 71 also receives light information 61 from photo diode 62 and issues a command 75, following the logic process 72, to unlock lock 2. Command 75 may be an RF signal, or other appropriate notice means.

FIG. 10 illustrates logic process 72. First decision 76 compares directional information 85 from a current instance to a saved initial instance. If there is a match, the event is passed as stored information 73; otherwise, it is discarded. Second decision 77 determines that there is a light event from light information 61 and passes this to third decision 78. Third decision 78 determines that there is match to a complete set of current directional instances in stored information 73. If there is a match, decision 78 issues command 75. Whether a match or a mismatch, decision 78 dumps all current event information and requires a start over.

In the preferred embodiment, shafts 20 are comprised of extruded aluminum and fabricated by machining. Any non-ferrous metal material and any suitable fabrication process would suffice as an alternative. For cost reasons, chassis assembly 10, wheels 30 and dials 40 are preferably injection molded. Aluminum fabrication for all components, however, except possibly in the case of the wheels where magnetization is required, would represent a more robust construction. The resins of choice would be ABS, Santoprene, or any polymer of comparable toughness and strength. In the preferred embodiment, a magnetic material would be molded as a fill material for wheels 30. Alternatively, magnetic strips could be insert-molded, or otherwise applied as appliques. Further, insert molding could be used to embed conduction paths for the light and sensors, thereby avoiding wiring or other circuitry.

While a particular form of the invention has been illustrated and described, it will be apparent that various modifications can be made without departing from the spirit and scope of the invention. For example, a visual pattern of polarized lighting could be used for a means for indicating. Accordingly, it is not intended that the invention be limited, except as by the appended claims.

The light source and sensor are hooded, requiring the source to come only from the transmitter. This helps prevent opening the lock with 'light flooding'. Also, a specific frequency of light and tuned sensor (IR, Near IR) can be used on a 'trade secret' basis

What is claimed is:

1. An electro-mechanical control for a lock, comprising:
    a plurality of mostly tubular shafts journaled concentrically about a common axis, each inner shaft extending from its outer in both axial directions, the shafts having proximal and distal ends;
    a plurality of wheels matched to the mostly tubular shafts, each fixed to the distal end of a corresponding shaft, each having an aperture at a common radial distance from the common axis;
    a plurality of dials matched to the mostly tubular shafts, each fixed to the proximal end of a corresponding shaft and thereby forming a unitary rotational assembly with wheel and shaft, each dial having a preferred orientation corresponding to an alignment of the apertures;
    a means for indicating the preferred orientation for each dial;
    a light source at one end of the plurality of wheels positioned at the common radial distance, the light source connected to a source of power through a means for connecting;
    a photo sensor positioned on the other end of the plurality of wheels for detecting a beam of light from the light source passed through the aligned apertures;
    a means for determining whether each wheel rotation was clockwise or counterclockwise, said means for determining including an electro-magnetic sensor utilizing Weigand technology; and
    a means for controlling the opening of the lock when the dials have been turned in a preferred direction to the preferred orientation.

2. The electro-mechanical control of claim 1, wherein the wheel is magnetized by one or more embedded or applied magnetic strips.

3. The electro-mechanical control of claim 1, wherein the means for controlling is a microcontroller receiving signal information from the photo sensor.

4. The electro-mechanical control of claim 1, wherein the means for controlling is a microcontroller operating with a logic process and receiving stored direction information from the electro-magnetic sensors and signal information from the photo sensor.

5. The electro-mechanical control of claim 4, wherein the stored information resides on EPROM memory.

6. A logic process for the microcontroller of claim 4, comprising the steps of:
- comparing a rotation direction from an initial instance in stored memory to a current instance from an electro-magnetic sensor for each rotation of each dial;
- storing the information in the event of a match and discarding the information in the event of a mismatch;
- comparing an instance of light detection from the photo sensor with stored event information;
- sending a command to unbolt the lock mechanism in the event of a match of a light instance with a set of stored direction instances equaling the plurality and ignoring the light instance in the event of a mismatch; and
- erasing stored direction instances in either a match or mismatch event associated with a light instance.

7. The electro-mechanical control of claim 1, further comprising a degree of freedom for the plurality of concentric shafts to translate back and forth along the common axis.

8. The electro-mechanical control of claim 7, wherein the means for connecting is a push-pull contact actuated by a translational push of the plurality of shafts coincident with the setting of the last preferred orientation.

9. The electro-mechanical control of claim 8, further comprising a pawl and detent mechanism to positively indicate and hold registration of the orientation of each wheel, the detents arrayed to facilitate the preferred orientation.

10. The electro-mechanical control of claim 9, wherein the pawls are mounted on beam springs to responsively pull the plurality of shafts thereby biasing the contact to the open position and optimizing the use of the source of power.

11. The electro-mechanical control of claim 1, further comprising a pawl and detent mechanism to positively indicate and hold registration of the orientation of each wheel, the detents arrayed to facilitate the preferred orientation.

12. The electro-mechanical control of claim 1, wherein the source of power is a Direct Energy Conversion Cell (DEC) battery.

13. The electro-mechanical control of claim 1, wherein the means for indicating is one or more features on each dial the juxtaposition of which presents in a particular visual pattern in the preferred orientation.

14. The electro-mechanical control of claim 13, wherein the one or more features is a distinguishing physical feature.

15. The electro-mechanical control of claim 13, wherein the one of more features is a color selected from a spectrum of color.

16. The electro-mechanical control of claim 1, further comprising a means for customizing the preferred orientation of each dial.

17. The electro-mechanical control of claim 16, wherein the means for customizing comprises resetting the dials on their respective shafts at the position of aperture alignment.

18. The electro-mechanical control of claim 1, wherein the light source is an LED.

19. The electro-mechanical control of claim 1, wherein the photo sensor is a photo diode.

20. The electro-mechanical control of claim 1, wherein the plurality of shafts defining the plurality of wheels and dials is three.

* * * * *